Sept. 29, 1959     A. CLARKSON     2,906,250
HOT WATER HEATER
Filed Dec. 14, 1956     2 Sheets-Sheet 1
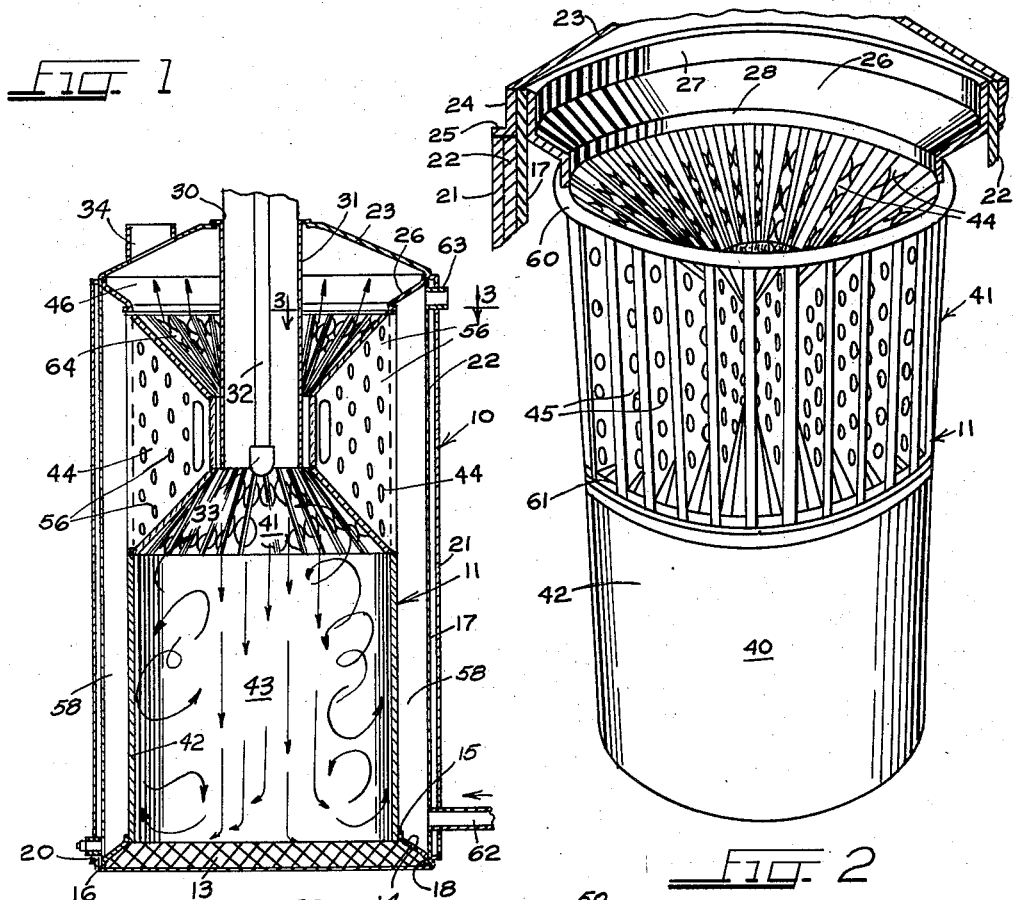
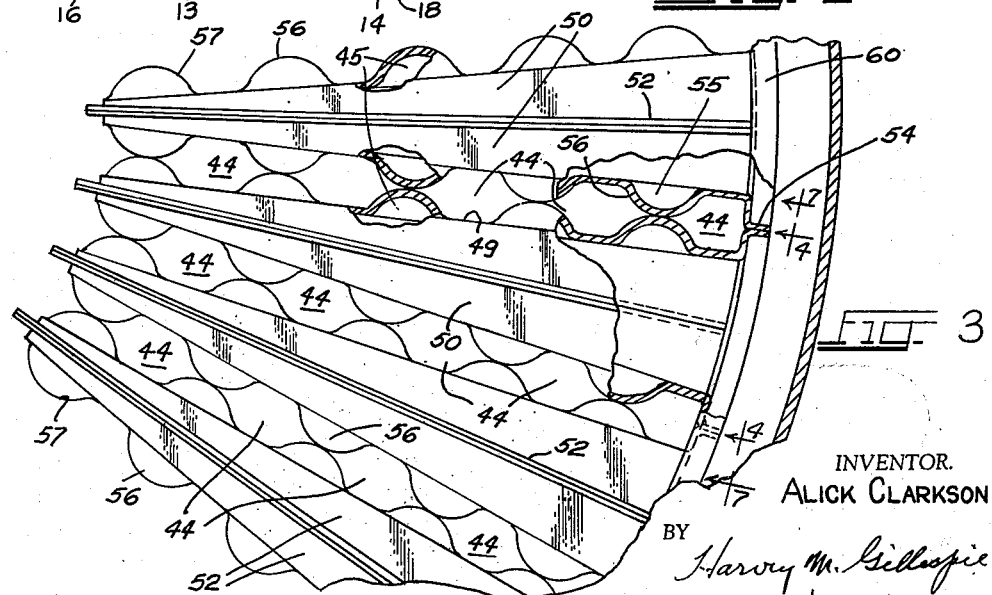
INVENTOR.
ALICK CLARKSON
BY
*Harvey M. Gillespie*
ATT'Y

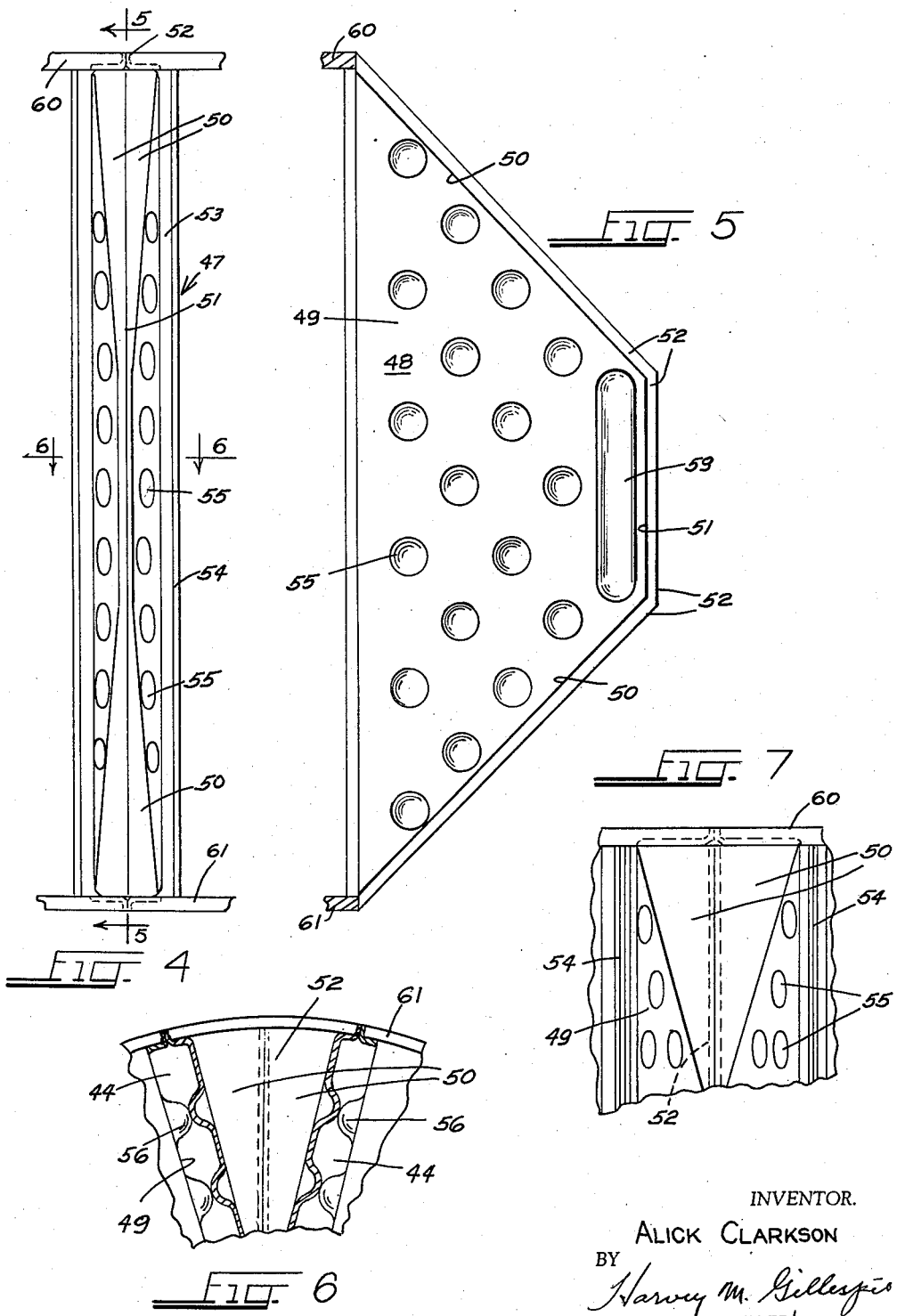

2,906,250
HOT WATER HEATER

Alick Clarkson, Paul Spur, Ariz., assignor to Vapor Heating Corporation, Chicago, Ill., a corporation of Delaware Application December 14, 1956, Serial No. 628,359

1 Claim. (Cl. 122—165)

The improved heater of the present invention has been designed for use primarily in connection with the heating of water where space limitations require a compact small unit as for example in motor driven buses, railway cars, and in portable heating equipment of various kinds. The invention is however capable of other uses and the same may, if desired, with or without suitable modification, be employed for the heating of fluids other than water, as well as for the heating of gases. Irrespective however of the particular use to which the invention may be put, the essential features thereof are at all times preserved.

The principal objects of the invention reside in the provision of an improved water heating device of the above described general character which is so constructed as to achieve:

(1) A high degree of thermal efficiency to insure operating economy at both high and low fire operation.

(2) An unusual degree of compactness to meet the limitations of space imposed by portable heating equipment.

(3) Simplicity of construction so that the heater lends itself to mass production methods as well as to ready assembly and disassembly for purposes of inspection, repair and replacement of parts when necessary.

(4) Light weight to facilitate handling and installation thereof as well as to meet the requirements of portable equipment.

(5) Flexibility of operation to satisfy the requirements of a large variety of installations.

(6) High turbulence in the combustion chamber and intimate surface contact between the heat exchange surfaces and the combustion gases to insure maximum efficient heat transfer.

The first outlined feature of the invention is made possible by the provision of a structure having a comparatively great heat exchange surface area between the gaseous and the water phases of the heater. This large surface area is accomplished to a certain extent by surrounding the combustion chamber wall with an annular jacket space which extends throughout the entire height of the combustion chamber and to a larger extent by the provision of a novel form of heat exchange unit per se which utilizes a multiplicity of spaced approximately radially extending dividing walls between the gaseous and water phases of the system which divide the unit into circumferentially arranged, radially extending, circumferentially narrow but longitudinally extensive cells, with alternate cells existing in the gaseous and water phases respectively. The radially extending side walls of the various cells are, in the main, of flat planar construction but spaced portions thereof are deformed inwardly of the gaseous phase and outwardly of the water phase so that not only is increased heat transfer surface area afforded the cells, but additionally retardation of the flow of hot gases of combustion through the gaseous phase is effected, thus enhancing the wiping action of the hot gases across the surfaces of the gas phase cells and increasing the thermal efficiency of the heater. The heat exchange unit per se is disposed in the system in series with the preliminary heating stage afforded by the combustion chamber wall 42 and behind the same with respect to the direction of flow of water through the system. By such an arrangement, a preliminary heating stage is effected which is followed by a secondary and final heating stage near the water outlet so that the water is brought to a high degree of heat as it leaves the system.

The second feature of the invention resides in the compact nesting of the various flat, tapered segmental cells in spaced radial fashion around the central axis of the fuel and air inlet pipe 31 and combustion chamber 43 as well as in the intimate association by proximity between the gaseous and water phases of the system throughout a large surface area that has hitherto been unattainable where other types of heating passages are employed.

The third feature outlined above is a result of sub-assembly construction. For example, the combustion chamber wall 42 and the heat exchange unit 41 per se constitutes a sub-assembly which can readily and quickly be installed, removed and replaced. Similarly, the fuel and air pipe and all attachments thereon constitute another detachable sub-assembly. The welded seam at the rim of the outer shell of the heater and the cover or hood therefor, which will subsequently by described in detail, may easily be opened by means of a cutting torch and rewelded after the exposed inner sub-assembly including the combustion chamber wall and heat exchange unit per se have been removed and replaced or a substitution made.

The fourth feature of the invention resides in the use of light sheet metal stampings in the formation of heat exchange cells and this lightness is further enhanced by the compactness of the structure as outlined above.

The fifth feature of the invention is made possible inasmuch as the heater assembly including the combustion chamber construction, the heat exchange unit per se, the burner construction and other instrumentalities are satisfactorily operable regardless of the position of orientation of the heater as a whole. Additionally, the direction of the burner construction and its cooperating combustion chamber may be reversed within the generally cylindrical heater construction without affecting the operation of the heater or impairing its efficiency.

Finally, the sixth feature of the invention as outlined above resides in the provision of a combustion chamber which is completely closed except at the fuel and air inlet end so that high turbulence may be maintained in the fire chamber to insure complete combustion.

Numerous other objects and advantages of the invention, not at this time enumerated, will become more readily apparent as the nature of the invention is better understood.

In the accompanying two sheets of drawings forming ap part of this specification a preferred embodiment of the invention has been shown.

In these drawings:

Fig. 1 is a sectional view taken substantially centrally and vertically through a hot water heater constructed in accordance with the principles of the present invention.

Fig. 2 is an enlarged perspective view of the heater with the outer heater shell broken away to reveal the nature of the fire box and heat exchange section assembly.

Fig. 3 is an enlarged fragmentary one-eighth section taken substantially along the line 3—3 of Fig. 1.

Fig. 4 is a sectional view taken substantially along the line 4—4 of Fig. 3.

Fig. 5 is a sectional view taken substantially along the line 5—5 of Fig. 4.

Fig. 6 is a fragmentary sectional view taken substantially along the line 6—6 of Fig. 4, and Fig. 7 is a fragmentary sectional view taken substantially along the line 7—7 of Fig. 3.

Referring now to the drawings in detail and in particular to Fig. 1, the improvements are described in connection with a water heater, but this specific use is exemplary only. Obviously it may be employed to heat oil and other liquids or gases. The invention involves in its general organization an outer shell assembly 10 of generally cylindrical configuration and an inner concentric combustion chamber and heat exchange assembly 11, the latter being concentrically nested within the former and the two assemblies presenting an upright heater structure.

The outer shell assembly 10 includes a circular bottom plate 12 on which there is supported a base 13 of refractory material the rim portion of which is encased in an open cup-shaped ring 14 having an upstanding circular flange 15 within which the lower end of the combustion chamber and heat exchange assembly 11 is centered and seated on the refractory base 13 as will be described presently. The circular bottom plate 12 is formed with an upstanding peripheral flange 16 within which there is nested the lower rim portion of an inner cylindrical shell wall 17. The ring 14 is formed with a downwardly extending peripheral flange 18 which is nested within the lower rim portion of the wall 17 and the three parts, namely the two flanges 16 and 18 and the rim of the wall 17 may be suitably joined together as by continuous welding. The upstanding flange 16 is turned laterally as at 20 and serves to support thereon the lower rim of an outer shell "skin" or wall 21, the latter being uniformly spaced from the inner wall 17, the flange and rim being continuously welded together. An insulating sheet 22 or the like is interposed between the inner and outer walls 17 and 21 and substantially fills the space existing therebetween.

In the upper regions of the heater structure, a generally conical or dome-shaped closure member in the form of a smoke hood and burner cover 23 is formed with a depending circular apron 24 which is turned laterally outwardly as at 25 and is supported on and secured to the upper rim of the outer shell wall 21 by welding. The upper region of the inner shell wall 17 extends into the apron 24 and is welded thereto by a continuous weld (Fig. 2). Nested within the extreme upper regions of the inner shell wall 17 is a circular ring 26 of generally conical design and having an upwardly extending vertical flange 27 welded to the wall 17 and a downwardly extending vertical flange 28 to which the upper regions of the inner combustion chamber and heat exchange assembly 11 is secured in a manner that will be made clear presently.

The hood 23 is formed with a central opening 30 in which there is mounted a conventional oil burner assembly including a downwardly projecting blower tube 31 through which the oil feed line 32 extends for conduction of the fuel to a burner nozzle 33. The usual stack 34 is provided for conducting the products of combustion from the apparatus.

As best seen in Figs. 1 and 2, the inner combustion chamber and heat exchange assembly 11 is comprised of two main parts, namely a lower fire box or combustion chamber assembly 40 and an upper heat exchange assembly 41. The combustion chamber assembly 40 is in the form of a cylindrical shell or wall 42, the lower rim of which is nested concentrically within and welded to the upstanding flange 15 and seated upon the peripheral regions of the refractory base 13. The interior cavity 43 of the shell 42 constitutes the combustion chamber and this chamber is concentric with and opposes the lower open end of the blower tube 31, thus providing a chamber of the reentrant type since the same is entirely closed except at the end into which the fuel and air are introduced. This type of combustion chamber is highly advantageous inasmuch as high turbulence can be maintained in the fire chamber to insure complete combustion while at the same time a wiping action is effected on the interior wall surface of the chamber to enhance efficient heat exchange characteristics as will be described subsequently.

The heat exchange assembly 41 is supported on the upper rim of the wall 42 of the combustion chamber and is in the form of a cellular sheet metal structure presenting a series of relatively flat hollow generally trapezoidal segmental cells which extend radially outwardly from the central regions of the shell assembly 10 toward the peripheral regions thereof with the small base of each trapezoid assuming a vertical position well within the confines of the shell assembly and with the large base thereof assuming a vertical position near the cylindrical shell wall. Alternate radial cells 44 (Figs. 2 and 3) open inwardly and downwardly and communicate with the gaseous phase of the combustion chamber and the intervening alternate cells 45 open outwardly and communicate with the water jacket of the heater exteriorly of the combustion chamber wall 42. The cells 44 also open inwardly and upwardly and communicate with the annular exhaust chamber 46 afforded by the hood 23, ring 26 and blower tube 31, the chamber 46 in turn communicating with the stack 34.

Referring now, additionally, to Figs. 4 to 7 inclusive, the cellular structure briefly outlined above is comprised of a plurality of box-like units 47, one of which is shown in end elevation in Fig. 4 and which is comprised of two mating sheet metal stampings 48 of identical design suitably welded together in a manner that will be made clear presently. Each stamping is in the form of a relatively shallow tray-like structure which, in plan elevation as shown in Fig. 5, includes an extensive wall 49 of trapezoidal configuration from which there extends laterally along the converging edges thereof a pair of generally triangular walls 50. Along the short edge of the trapezoidal wall 49 a shallow wall 51 extends laterally and is joined to the adjacent walls 50 as shown in Fig. 4. The outer rim portions of the three walls 50 and 51 are turned outwardly as shown at 52 to provide a continuous attachment flange around three sides of the stamping design for continuous resistance seam welding to the corresponding attachment flange on a mating stamping 48 when the two stampings are assembled to form the composite unit 47. The long edge of the trapezoidal wall 49 is turned laterally as at 53 in a direction opposite to the direction of extent of the walls 50 and 51 and the flange thus formed is turned outwardly as at 54 to provide a radial flange in the heat exchange assembly designed for welding to a similar and corresponding flange on an adjacent unit 47 when the various units are assembled in the completed structure. The trapezoidal wall 49 is formed with a series of deep drawn semi-spherical offset depressions 55 therein providing a series of reinforcing spacers and heat-exchange protuberances 56 on the outer side of the tray-like structure. Along the short edge of the wall 49 there is provided an elongated depression 57 which is substantially coextensive with this edge. The nature and function of these various protuberances will be set forth subsequently.

In assembling each of the units 47, two of the tray-like stampings 48 are brough together so that the deep and shallow ends of the structures respectively are in register and the continuous angular attachment flanges 52 of the two stampings are seam welded together along the two inclined sides and the short sides of the stampings. This results in the provision of the box-like structure 47 shown in Fig. 4 which, when assembled with other similar structures in the heat exchange unit 41, assumes a vertical radial position and presents a relatively thick open outer end in communication with the annular space or water jacket 58 existing between the shell wall 22 and the outer cylindrical confines of the assembly 11. The structure 47 also presents a relatively thin inner end which is closed by the meeting shallow walls 51, as well as inclined top and bottom walls afforded by the meeting walls 50.

The various composite units 47 are assembled in radial fashion in the unit 41 as best seen in Figs. 2 and 3 and, when so assembled, the crests of adjacent protuberances 56 on each pair of opposed or adjacent walls 49 will make point contact with each other so that the opposed walls 49 of adjacent units 47 will be maintained spaced from each other in parallelism while at the same time the medial planes of the various tapered pancake units will converge toward the central axis of the heat exchange unit 41.

The composite units 47 are tied together, so to speak, at their upper and lower outer acute corners by means of upper and lower circular rings 60 and 61 respectively the former being welded to the rim of the depending flange 28 on the ring 26 and the latter being welded to the upper rim of the combustion chamber wall 42. The rings 60 and 61 are welded as shown in Fig. 5 to the ends of the flanges 52 and 54 at the top and bottom of the structure respectively, the welds of course being of a continuous nature so as to seal the gaseous and water phases of the structure from each other.

As shown in Fig. 1, the water phase of the structure is provided with a water inlet pipe 62 adjacent the bottom of the shell 21 and a water outlet pipe 63 adjacent the top thereof. The pipes 62 and 63 project completely through the inner and outer walls 17 and 21 respectively and through the insulating sheet 22 and communicate with the annular space 58.

From the above description it will be seen that in the operation of the hot water heater the re-entrant type of combustion chamber employed will cause portions of the fuel and gases of combustion to be projected in the form of a centrally directed jet through the gaseous body within the combustion chamber 43, with the jet striking the bottom of the chamber, i.e. the refractory base 13, so that the jet will be spread outwardly radially with a swirling motion in the outer regions of the chamber and returned upwardly as indicated by the swirl lines in Fig. 1 so as to produce a strong "wiping" action on the inner face of the combustion chamber wall 42 whereby much heat is transferred to the annular body of water within the space 58 through the wall 42. The hot gases continue upwardly and enter the various narrow but extensive chambers or cells 44 and, in passing upwardly through these cells, they are impeded to a certain extent by the protuberances 56 which are staggered so as to effect a maximum wiping action in the manner of a baffle arrangement with maximum heat transfer therethrough. From the cells 44, the gases pass upwardly and enter the generally conical space 64 existing immediately below the ring 26 in the gaseous phase and from thence they pass upwardly through the ring 26 and annular space 46 to the stack 34.

In the water phase of the heater, the water enters the annular space 58 near the bottom of the shell 21 from the inlet pipe 62 and encircles the combustion chamber, flowing upwardly and becoming distributed to the various radial water phase cells 45 through which it passes upwardly while at the same time absorbing heat through the walls 49 and bulbous portions 55 thereof. Finally, the water at the top of the structure flows outwardly through the pipe 63 in its maximum heated condition.

From the above description it will be seen that an extremely large surface area for heat transfer between the gaseous and water phases of the structure is provided. This area includes not only the combustion chamber wall 42 and the comparatively broad side wall areas 49 but also the narrow end wall areas 51 and the inclined upper and lower wall areas 50 (Fig. 4).

While I have illustrated my invention in connection with certain preferred embodiments, it will be obvious to persons familiar with the art that various modified structures might be made without departing from the spirit of the invention disclosed. Therefore it will be understood that I contemplate all modifications in structure falling within the scope of the appended claim.

I claim:

A water heater of small compact construction comprising an outer cylindrical shell, an inner shell including a cylindrical portion defining a combustion chamber and a heat exchanger portion at one end of said combustion chamber, said inner shell having walls arranged in spaced relation to the outer shell and cooperating therewith to define a jacket for containing water to be heated, and the said heat exchanger being composed of a series of spaced apart hollow cells having open outer ends communicating with said water jacket and extending radially inwardly therefrom, the said cells having top, bottom and opposed side walls defining wedge-shaped water chambers the bottom walls of which incline upwardly and inwardly toward their inner extremities, a body of refractory material closing the end of the combustion chamber opposed to said heat exchanger, and a fuel burner at the heat exchanger end of the inner shell and including an air tube mounted to extend axially through said heat exchanger portion to a point adjacent the inner ends of said bottom walls of said cells.

References Cited in the file of this patent

UNITED STATES PATENTS

| | | |
|---|---|---|
| 103,059 | Law | May 17, 1870 |
| 431,354 | Howatt | July 1, 1890 |
| 785,580 | Shiels et al. | Mar. 21, 1905 |
| 791,876 | Burdh | June 6, 1905 |
| 1,123,750 | Kane | Jan. 5, 1915 |
| 1,755,949 | Clarkson | Apr. 22, 1930 |
| 1,895,075 | Horton | Jan. 24, 1933 |
| 2,430,227 | Jensen et al. | Nov. 4, 1947 |